United States Patent
Chang et al.

[11] Patent Number: 6,131,415
[45] Date of Patent: Oct. 17, 2000

[54] METHOD OF MAKING A FIBER HAVING LOW LOSS AT 1385 NM BY CLADDING A VAD PREFORM WITH A D/D<7.5

[75] Inventors: Kai Huei Chang, Suwanee; David Kalish, Roswell; Thomas John Miller; Michael L. Pearsall, both of Alpharetta, all of Ga.

[73] Assignee: Lucent Technologies Inc., Murray Hill, N.J.

[21] Appl. No.: 08/879,348

[22] Filed: Jun. 20, 1997

[51] Int. Cl.$^7$ .................................................. C03B 37/027
[52] U.S. Cl. ................................. 65/391; 65/412; 65/426; 65/414
[58] Field of Search .............................. 65/412, 391, 426, 65/414

[56] References Cited

U.S. PATENT DOCUMENTS

| | | |
|---|---|---|
| 3,933,454 | 1/1976 | DeLuca . |
| 4,310,341 | 1/1982 | Barns et al. . |
| 4,564,378 | 1/1986 | Kuisl . |
| 4,578,101 | 3/1986 | Clark et al. . |
| 4,675,038 | 6/1987 | Ainslie et al. . |
| 4,685,945 | 8/1987 | Freund . |
| 4,737,179 | 4/1988 | Tanaka et al. ............................ 65/3.12 |
| 4,775,401 | 10/1988 | Fleming et al. ......................... 65/3.11 |
| 4,820,322 | 4/1989 | Baumgart et al. ....................... 65/3.11 |
| 4,842,626 | 6/1989 | Barns et al. . |
| 4,880,452 | 11/1989 | Kanamori et al. ....................... 65/3.12 |
| 5,000,771 | 3/1991 | Fleming, Jr. et al. . |
| 5,397,372 | 3/1995 | Partus et al. . |
| 5,578,106 | 11/1996 | Fleming, Jr. et al. . |

FOREIGN PATENT DOCUMENTS

0249230   11/1987   European Pat. Off. .

OTHER PUBLICATIONS

F. Hanawa, et al., Fabrication of Completely OH–Free V.A.D. Fibre, Electronics Letters, Aug. 28, 1980, vol. 16, No. 18, 699–700.

K. Kosaka, et al., "Fabrication of ultralow–loss and low–OH VAD single–mode fibers," in Proc, 10$^{th}$ ECOC, Sep., 1984, pp. 292–293.

K. Kosaka, et al., "Low–loss, low OH content single–mode fiber," Nat. Conv. IECE J., vol. 1144, p. 4–198, Mar. 1984.

Kosaka, et al., "Fabrication Of Ultra Low–Loss And Low–OH VAD Single Mode Fibers", *Optical Communication, ECOC'84*, Sep. 1984, 292–293.

Nagel, S., "Fiber Material and Fabrication Methods," *Optical Fiber Telecommunications II*, Academic Press, 1988, S. E. Miller, et al. eds., 169–180.

(List continued on next page.)

*Primary Examiner*—John Hoffmann
*Attorney, Agent, or Firm*—Michael A. Morra

[57] ABSTRACT

A singlemode optical fiber 700 having very low loss at 1385 nm, and a practical method for making same are disclosed. A core rod 20 is fabricated using vapor axial deposition to have a deposited cladding/core ratio (D/d) that is less than 7.5. The core rod is dehydrated in a chlorine- or fluorine-containing atmosphere at about 1200° C. to reduce the amount of OH present to less than 0.8 parts per billion by weight, and then consolidated in a helium atmosphere at about 1500° C. to convert the porous soot body into a glass. The consolidated core rod is elongated using an oxygen-hydrogen torch that creates a layer of OH ions on the surface of the rod that are largely removed by plasma etching. Finally, the core rod is installed in a glass tube 40 having a suitably low OH content. Thereafter, the tube is collapsed onto the rod to create a preform 60. Conventional methods are employed for drawing an optical fiber from the preform and applying one or more protective coatings 75, 76. The disclosed method is suitable for commercial production of low-OH fiber. Significantly, the fiber's loss at 1385 nm is reduced to a level that is less than its loss at 1310 nm, thereby rendering the entire wavelength region 1200–1600 nm suitable for optical transmission. In particular, wave-division-multiplex systems are now available to transmit optical signals over distances greater than 10 km in the wavelength region between 1360 nm and 1430 nm.

9 Claims, 6 Drawing Sheets

OTHER PUBLICATIONS

Murata, H., "Recent Developments In Vapor Phase Axial Deposition," *Journal of Lightwave Technology*, vol. LT–4, No. 8, Aug. 1986, 1026–1033.

Moriyama, et al., "Ultimately Low OH Content V.A.D. Optical Fibres," *Electronics Letters*, Aug. 1980, vol. 16, No. 18, 698–699.

Hanawa, et al., "Tunable Magnetostatic Surface Wave Demultiplexing Fiber/Switch," *Electronics Letters*, Aug. 1980, vol. 16, No. 18, 699–700.

Mochizuki, et al., "Behavior of Hydrogen Molecules Absorbed On Silica In Optical Fibers," *IEEE Journal Of Quantum Electronics*, vol. QE–20, No. 7, Jul. 1984, 694–697.

METHOD OF MAKING A FIBER HAVING LOW LOSS AT 1385 NM BY CLADDING A VAD PREFORM WITH A D/D<7.5

TECHNICAL FIELD

This invention generally relates to singlemode optical fibers and, more particularly, to the fabrication of an optical fiber having desirable transmission characteristics over the entire wavelength region 1200–1600 nanometers (nm).

BACKGROUND OF THE INVENTION

Optical loss in a glass fiber is the measure of the purity of the glass, and describes how the light is attenuated from the input end of the fiber to its output end. The lower the loss, the greater the distance that light can travel before it must be amplified. Loss through glass is particularly low in the wavelength region 1200–1600 nm, and yet for years lightwave transmission has been confined to the wavelength regions around 1310 nm and 1550 nm. A number of factors have conspired to confine transmission to these regions including: fiber bending loss above 1600 nm; the gain characteristic of present-day optical amplifiers; Rayleigh scattering; and hydroxyl-ion (OH) absorption centered around 1385 nm. With regard to the availability of light sources in the 1360–1430 nm wavelength region, a "no-man's land" has been created. However, there is no physical barrier to producing optical sources throughout the wavelength range 1200–1600 nm with the Indium Phosphide (InP)—based materials system. In fact, many researchers have produced lasers at various wavelengths in this region precisely to study optical absorption not only in fiber, but also in the characterization of atmospheric contaminants. Moreover, fiber-amplifier pump lasers have been made to emit at 1480 nm.

FIG. 1 shows the overall spectral loss curve for an optical fiber having a glass core. The loss curve is shown in the wavelength region where the overall loss is low enough for practical optical systems to operate. Loss in this wavelength region is primarily attributable to Rayleigh scattering and OH absorption.

Rayleigh scattering is a basic phenomenon that results from density and compositional variations within the fiber material. These variations occur when the glass is produced, since it must pass through the glass transition point in becoming an amorphous solid. There is a certain level of thermal agitation occurring at the transition point, causing thermal and compositional fluctuations that are "frozen" into the lattice at the softening point and are dependent on material composition. The scale of these imperfections is smaller than the wavelength of the light. They are fundamental, cannot be eliminated, and set the lower limit on fiber loss. Rayleigh scattering is proportional to $1\lambda^4$, where $\lambda$ is the wavelength of the light.

Optical loss at 1385 nm is a measure of the water remaining in the glass. The more water that is present, the higher the loss. Accordingly, hydroxyl-ion absorption is frequently referred to as "water" absorption, and it arises from lightwave energy being absorbed by the OH ion at wavelengths that are related to its different vibration modes. For example, the two fundamental vibrations of this ion occur at 2730 nm and 6250 nm and correspond to its stretching and bending motions respectively. Nevertheless, overtones and combination vibrations strongly influence the loss in the near infrared and visible wavelength regions. In particular, the overtone at 1385 nm resides in the heart of a transmission region where future optical fiber systems may be operated. It has long been desirable to reduce this particular "water peak" to as low a value as possible. Unfortunately, concentrations of OH as low as one part per million (ppm) cause losses as high as 65 dB/km at 1385 nm. And while it is desirable to reduce OH concentration to a level such that the overall optical loss at 1385 nm is comparable to the overall optical loss at 1310 nm (i.e., about 0.33 dB/km), it has not been commercially feasible to reduce it a thousandfold to about 0.8 parts per billion (ppb). Such an OH concentration would add 0.05 dB/km to the Rayleigh scattering loss at 1385 nm in order for the overall loss at this wavelength to be about 0.33 dB/km.

Three "windows" are shown in FIG. 1—each identifying a wavelength region for normal operation on an optical fiber. Historically, early fiber systems operated near 825 nm (the first window) because laser sources and detectors became available at these wavelengths in 1979. Second window systems operating near 1310 nm became available between 1980 and 1983 and, more recently, third window systems operating near 1550 nm were introduced in 1986. For future optical systems, elimination of the water peak at 1385 nm, in a commercially available optical fiber, would effectively open the entire wavelength range 1200–1600 nm for lightwave transmission.

In multimode fibers, lightwaves are strongly confined to the core due to the relatively large difference in refractive index between the core and the deposited cladding that surrounds it. And since lightwaves are effectively confined to the core in multimode fibers, OH ions in the cladding do not have a significant effect on optical loss. Indeed, multimode fibers having low OH absorption in the 1385 nm region have been fabricated and are reported in the literature. See, for example, Moriyama et al. *Ultimately Low OH Content V.A.D. Optical Fibres,* Electronics Letters, Aug. 28, 1980 Vol. 16, No. 18, pp. 698–699. However, it is desirable to fabricate a singlemode fiber, wherein a significant portion of the energy travels in the cladding, having a low water-absorption peak at 1385 nm.

A singlemode optical fiber having a low water-absorption peak at 1385 nm was reported during August, 1986 in the article *Recent Developments in Vapor Phase Axial Deposition* by H. Murata, Journal of Lightwave Technology, Vol. LT-4, No. 8, pp. 1026–1033. However, low water absorption is achieved by initially depositing a substantial amount of cladding onto the core prior to overcladding with a silica tube. (The VAD process is capital intensive, and any reduction in productivity increases the manufacturing cost to the point that depositing large amounts of cladding are unacceptable for the mass production of preforms.) A figure of merit (D/d), known as the deposited cladding/core ratio, has been defined as the ratio of the diameter of the rod (D) to the diameter of the core (d); and it is desirable for this dimensionless number to be as low as possible because the amount of deposited material is proportional to $(D/d)^2$. Murata reports that the deposited cladding/core ratio is greater than 7.5 before it is overclad with a silica-tube in order to assure low OH content in the fiber for a number of different overcladding tubes. Nevertheless, it is desirable to fabricate a core rod having low OH content wherein D/d is less than 7.5.

It is known to fabricate an optical fiber having low OH content using the modified chemical vapor deposition (MCVD) process such as shown in U.S. Pat. No. 5,397,372 that issued on Mar. 14, 1995. In this patent, a hydrogen-free plasma torch is used for the deposition of high-index material inside a glass tube. The glass tube is then collapsed to become a preform, but only short lengths of fiber (e.g., 0.7 km) can be drawn from such a preform. In commercial production, however, large preforms are required for making long lengths of fiber. And the rod-in-tube technique is a cost-effective way of making large preforms, although OH contamination can be a serious problem.

Accordingly, what is sought is an optical transmission system that is capable of operating over long distances at wavelengths in the 1360–1430 nm region. More importantly, what is sought a singlemode optical fiber having a low water peak at 1385 nm and a commercially viable process for making same.

SUMMARY OF THE INVENTION

A process for fabricating a singlemode optical fiber having low optical loss at 1385 nm starts with the step of forming a glass rod having a core whose index of refraction is higher than the index of refraction of a layer of deposited cladding that surrounds it. The diameter of the core is designated (d) and the diameter of the deposited cladding is designated (D). The core rod has a cladding/core ratio that is less than 7.5, and the concentration of OH ions is less than 0.8 parts per billion by weight. The core rod is elongated prior to installation in a hollow glass tube having a suitably low concentration of OH ions. After installation, the tube is collapsed onto the core rod by exposing the tube to a heat source. The resulting structure is referred to as a preform.

An optical fiber is formed by placing the preform in a furnace and drawing a thin glass fiber from one end. The glass fiber is then coated with one or more layers of protective coating material(s), which are cured by radiation.

In an embodiment of the invention, the core rod is doped with germanium and fabricated by vapor axial deposition (VAD). Once the core rod is formed, it is dehydrated in a chlorine or fluorine-containing atmosphere at a temperature less than 1300° C., and then consolidated in a helium atmosphere at a temperature greater than 1400° C. A small amount of material is removed from the surface of the rod during etching, which is preferably accomplished using a hydrogen-free plasma torch.

In one embodiment, elongation of the core rod is achieved using an oxygen-hydrogen torch, which subsequently requires an etching step to remove the layer of OH contaminants on the surface of the rod that are created by the torch. In another embodiment, elongation of the core rod is achieved using a hydrogen-free plasma torch, which does not contaminate the surface of the rod and, hence, does not require a subsequent etching step.

The inventors are the first to recognize that commercial production of optical fiber having very low OH content is possible; and that this can be achieved using known steps that have never been combined before. Indeed, notwithstanding the long-felt need to use the entire wavelength region 1200–1600 nm for optical transmission, and reports of "heroic" experiments during the early 1980's demonstrating that optical fiber can be fabricated with low OH content, no manufacturer commercially offers such a product today!

BRIEF DESCRIPTION OF THE DRAWING

The invention and its mode of operation will be more clearly understood from the following detailed description when read with the appended drawing in which.

DETAILED DESCRIPTION

Figure 3:
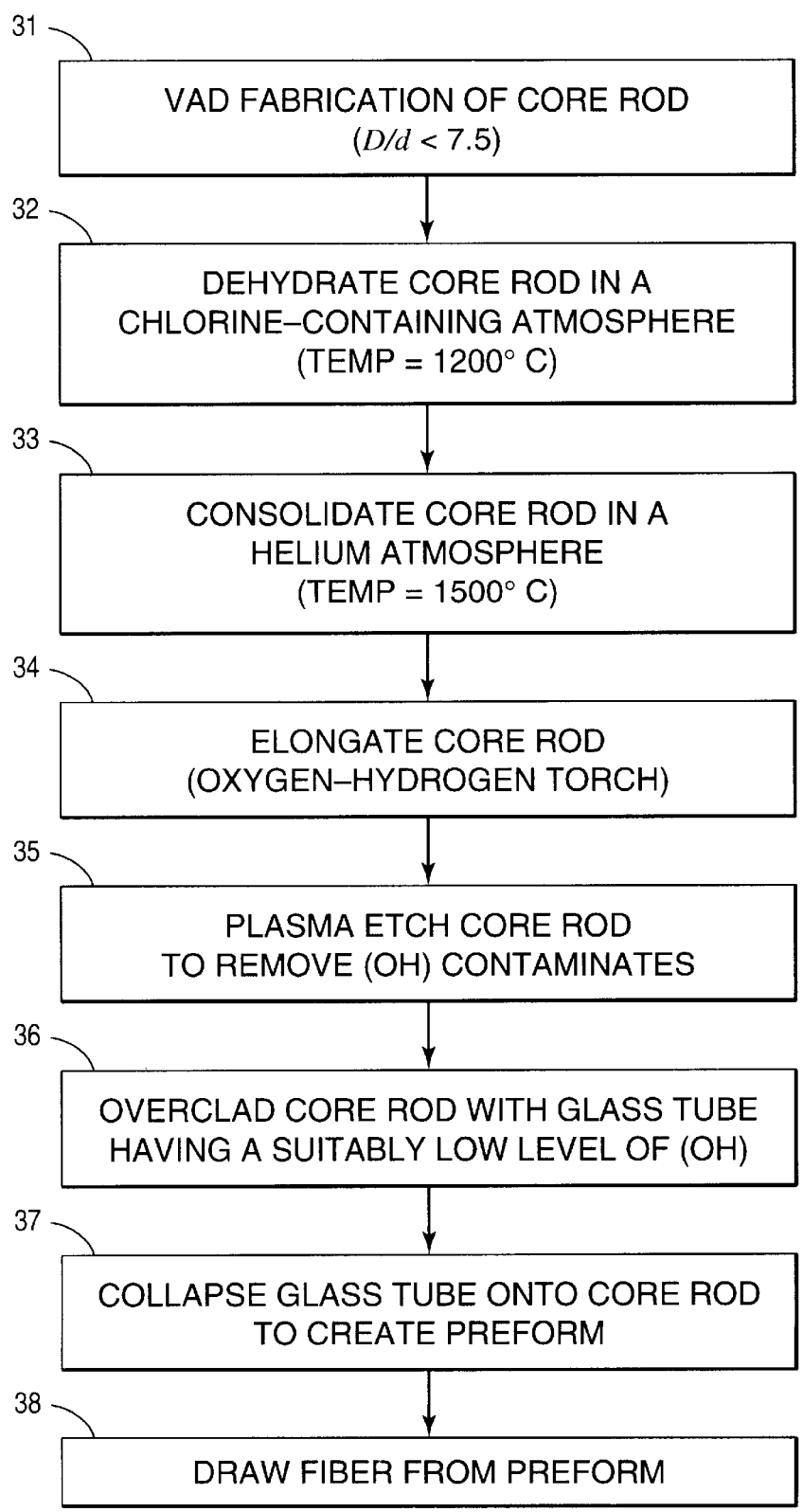
FIG. 3 is a flow-chart diagram of a method for making an optical fiber in accordance with the invention.

Reference is initially made to FIG. 3 which provides a general overview of the preferred method for fabricating an optical fiber having low loss at 1385 nm in accordance with the present invention. These steps have individual numerals (31–38) which will be referred to throughout this specification. The first three steps (numerals 31–33) relate to the fabrication of a core rod having a suitably low OH content (i.e., less than 0.8 parts per billion) that can be overclad with a glass tube. Accordingly, the first three steps can be replaced by the single step of forming a core rod having a deposited cladding/core ratio that is less than 7.5, and having an OH content that is less than 0.8 parts per billion by weight. Preferably, the core rod is fabricated by VAD per step numeral 31 as discussed below:

Core Rod Fabrication

Figure 1:
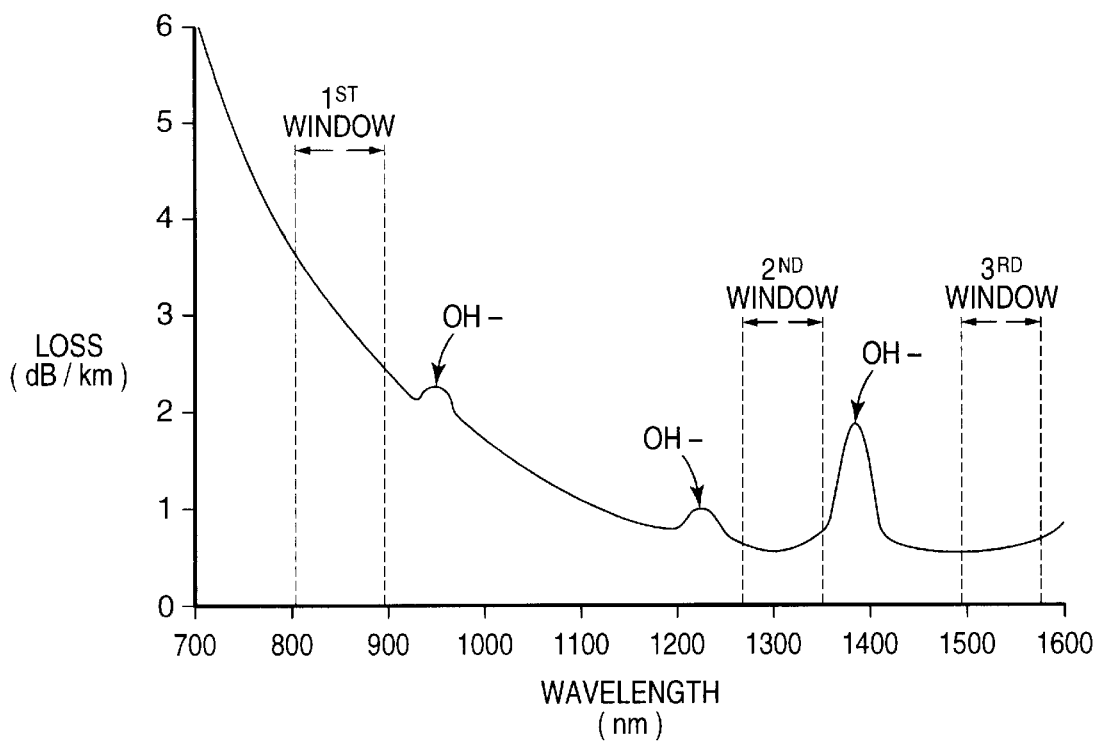
FIG. 1 shows the overall loss spectrum of known optical fibers, illustrating the losses that attributable to energy absorbed by OH ions at various wavelengths.
Figure 2:
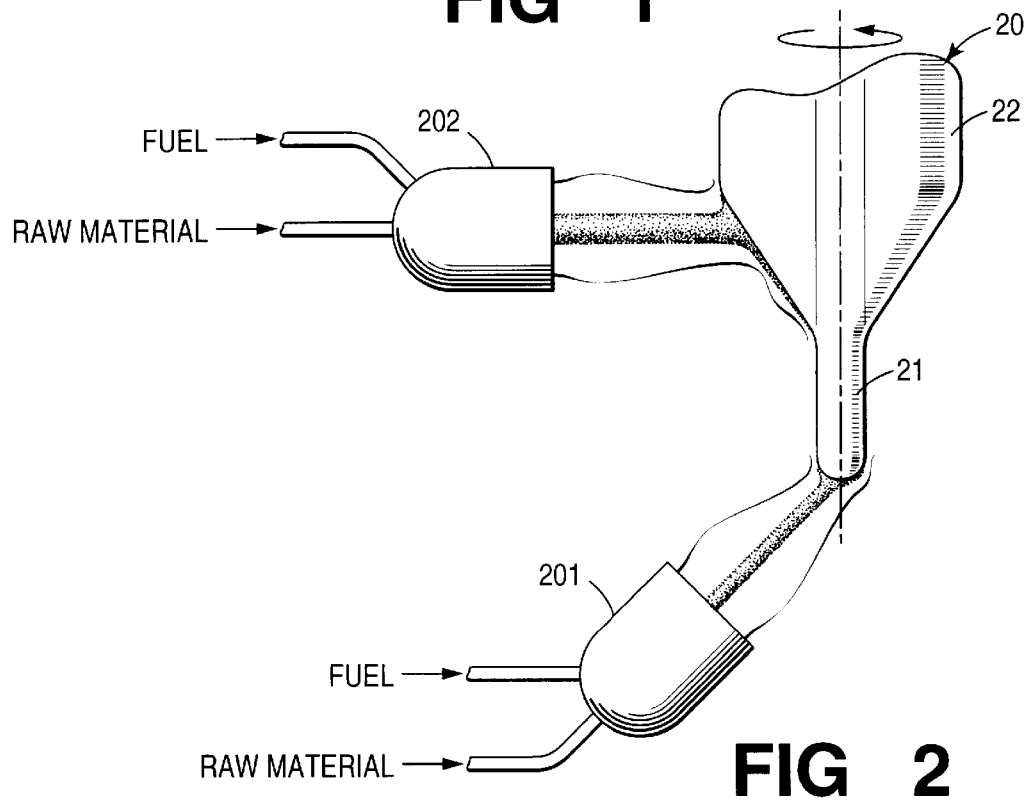
FIG. 2 generally illustrates the fabrication of a core rod by the vapor axial deposition process.

Reference is made to FIG. 2 for a discussion of the VAD process in which glass particles or "soot" are deposited on a silica starting rod. Core rod 20 comprises a core 21 whose index of refraction is higher than the index of refraction of the deposited cladding 22. It is noted that light bends toward the region whose index of refraction is higher, and it this law of physics that is invoked to guide light along the center of an optical fiber. To create a region having a relatively high index of refraction, a torch 201 is supplied with fuel (e.g., oxygen and hydrogen) and raw material (e.g., $GeCl_4$ and $SiCl_4$) such that the torch projects vaporized raw material within a flame toward the center of the glass rod. The flame causes the raw material to react so as to deposit glass particles (soot) onto the core rod 20. The core rod typically extends vertically with the initial deposition at its upper end. It is then moved vertically upward and rotated so that glass soot is deposited along its entire length and circumference. Another torch 202 is used to deposit a layer of glass 22, called the deposited cladding, onto the core 21. The raw material used in torch 202 for making the cladding 22 is $SiCl_4$, for example. It is thus noted that germanium doping of the core 21 is one way to create a core having a higher index of refraction than the cladding. Alternatively, $SiCl_4$ can be the raw material used in making the core 21 while fluorine doping of the deposited cladding will create a cladding with a lower index of refraction than the core. In this situation, fluorides such as $SF_6$, $CCl_2F_2$, $CF_4$ are mixed with $SiCl_4$ in the cladding torch 202. Specific details regarding different fiber fabrication processes are contained in Chapter 4 of the textbook *Optical Fiber Telecommunica-*

*tions II*, Academic Press, Inc., © 1988 AT&T and Bell Communications Research, Inc. In particular, section 4.4.4 (pages 169–180) deals with the VAD process and is hereby incorporated by reference.

In the above-described VAD process, the diameter of the deposited cladding (D) is less than 7.5 times the diameter of the core (d). And because core rod fabrication is an expensive process, any time saved in making the core rod translates directly into lower fiber cost. In fact, the amount of VAD deposit required for the core rod is proportional to $(D/d)^2$. But as D/d for the core rod becomes smaller, the need for purity in the overcladding tube becomes greater. By decreasing D/d, more optical power in the fiber travels in the overcladding tube, and impurities such as OH ions cause additional absorption loss. This is because OH ions are mobile and will migrate toward the core, particularly during the fiber draw operation. And, even worse, OH ions can decompose into hydrogen, which is much more mobile than OH itself, and can also diffuse into the fiber core during fiber draw. Subsequent reaction between the hydrogen and atomic defects in the fiber core will cause OH ions to form there. Core rods having deposited cladding/core ratios that are less than 2.0 require overcladding tubes having unusually low OH content, which is not cost effective at the present time. Accordingly, a commercially practical range for deposited cladding/core ratios has been determined to be $2.0<D/d<7.5$ at present.

Step numeral 32 in FIG. 3 indicates that the core rod is dehydrated by placing it in a chlorine- or fluorine-containing atmosphere at a temperature of about 1200° C. At this stage, the core rod is a porous soot body and chlorine gas, for example, easily permeates the interstices of the soot body and replaces OH ions with chlorine ions, thereby resulting in a soot body that is substantially water free. The OH ion replacement rate is related to the chlorine gas flow rate and the dehydration temperature.

Step numeral 33 in FIG. 3 indicates that the core rod is consolidated by placing it in a helium atmosphere at a temperature of about 1500° C. Consolidation is the step in which the porous soot rod is converted into a dense glass that is free from particle boundaries. Specific details regarding the dehydration and consolidation steps are provided in U.S. Pat. No. 3,933,454, which issued on Jan. 20, 1976 and is hereby incorporated by reference.

Step numeral 34 in FIG. 3 indicates that the core rod is preferably elongated using an oxygen-hydrogen torch. This is the most cost-effective manner of supplying the large amount of heat needed for this step. Alternatively, this step is carried out using a hydrogen-free plasma torch, as discussed below, and advantageously eliminates the need for etching (step numeral 35). Typically, core rods grown by the VAD process are too large to fit into overcladding tubes of reasonable size, and are usually stretched to decrease their diameter prior to insertion. Stretching is accomplished on a glass lathe whose construction is well known in the art. The core rod is mounted between the headstock and tailstock of the lathe for cojoint rotation therewith. As the core rod rotates, a torch moves below it along its central axis at a constant rate toward the headstock. Simultaneous with the movement of the torch, the tailstock moves away from the headstock, causing the core rod to be stretched to reduce its diameter. Combustible gases, such as hydrogen and oxygen are flowed through the torch at an exemplary rate of 30 liters per minute (1 pm) and 15 lpm respectively. And while the use of hydrogen is commercially practical, it creates a layer of OH on the surface of the core rod. Core rod stretching is known in the art and specific details are disclosed, for example, in U.S. Pat. No. 4,578,101 that issued on Mar. 25, 1986.

Core Rod Etching

Figure 4:
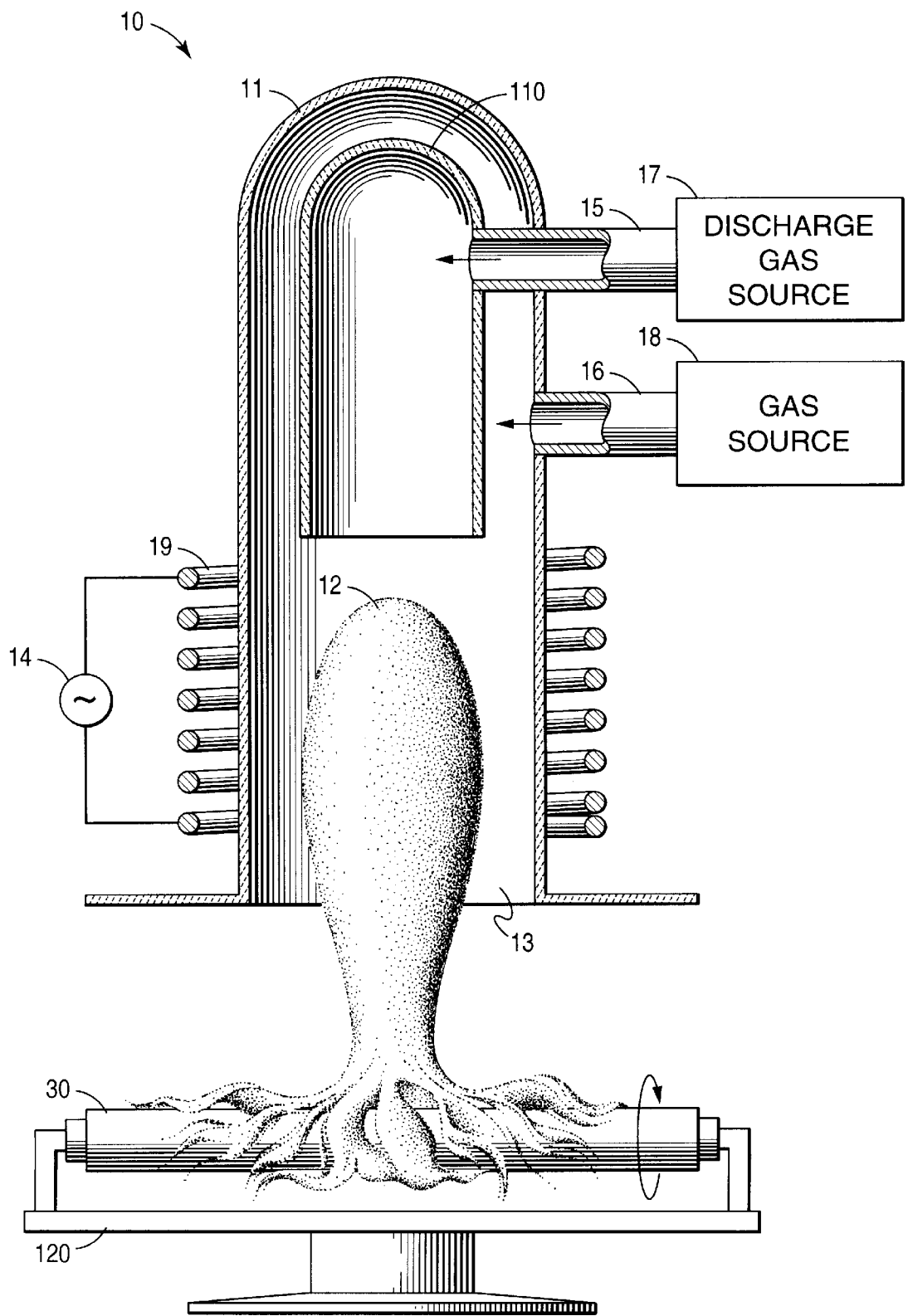
FIG. 4 shows a plasma torch removing OH ions from the surface of a core rod.

Step numeral 35 indicates that the elongated core rod is etched, preferably with a hydrogen-free plasma torch. FIG. 4 schematically shows apparatus for the plasma etching of core rod 20 to remove a substantial portion of the OH ions that are present on the surface of the rod. Detailed information regarding plasma etching is available in U.S. Pat. No. 5,000,771, which issued on Mar. 19, 1991 and is hereby incorporated by reference. A brief discussion of the plasma etching process is given below, although it is understood that other etching techniques may be employed to effectively remove OH ions from the rod's surface. These other etching techniques include, but are not limited to, mechanical grinding and chemical etching.

An isothermal plasma can be used for rapidly removing (etching) silica and silicate glass from the outer surface of a glass rod. With an isothermal plasma torch, the predominant mechanism for material removal is vaporization due to the high plasma temperature, which can typically attain levels greater than 9000° C. in the plasma center. Contact of the electrically conductive fireball with the refractory dielectric surface efficiently transfers energy to the surface, and raises the surface temperature above the vaporization point of the dielectric materials thereon.

FIG. 4 schematically depicts an exemplary apparatus for plasma etching. A torch 10 comprises a fused silica mantle 11 connected both to a gas source 18 by tube 16 and to a gas source 17 by tube 15. Gas source 17 delivers the desired gas used for the plasma discharge into the mantle 11 and through shield 22. The plasma fireball 12 is excited by an RF coil 19 and an RF generator 14. Gas sources are generally used to provide an ionizable gas, with the plasma fireball primarily contained in a confinement region of the torch. A substantial portion of the plasma fireball can be pushed out of the confinement region by adding, to the ionizable discharge gas, a high ionization threshold gas. The additional gas, supplied by gas source 18 and confined to the outer region of the torch by shield 110, creates an area in the upper portion of the confinement region where higher energy is needed to couple RF energy into the gasses to form a plasma. The portion of the fireball outside the torch is typically less than 50%, since maintaining a stable plasma generally requires the plasma center to remain in the torch for sufficient energy to couple into the plasma from the RF source. Additionally, operation with the fireball extended outside the torch by approximately 30% to 50% of its volume generally places greater requirements on the power requirements of the RF source and the flow rate of the gases involved with the process than operation below 30% of the fireball volume. By pushing the plasma center towards the torch exit, the plasma fireball can easily contact the core rod 30. Furthermore, contact is most readily made as the plasma fireball is pushed farther outside the torch.

The core rod 30 is mounted on a lathe 120 in such a way that the rod can be rotated. Generally, means for mounting and rotating such rods are known to those skilled in the art. Rotating the cylindrical core rod uniformly, with appropriate movement of the plasma torch along the rod, allow material to be removed from substantially the entire surface such that the core rod 30 retains its cross-sectional shape. More importantly, this particular etching technique allows removal of OH ions from the rod surface. In the preferred embodiment of the invention, an etch depth of 0.25±0.15 mm is selected. Accordingly, a core rod having a diameter of about 20 mm before plasma etching would have a diameter of about 19.5 mm after etching.

Gas flow rates into the plasma torch with either $O_2$ or $O_2$/Ar as the currently preferred gas, generally range from 1.0 to 100 liters/min. The plasma fireball, excited by an RF generator that typically provides output power between 20 and 40 kW at 3 MHz, for example, traverses the core rod at speeds typically from 0.01 to 100 cm/sec covering about 1 meter of the core rod being processed. Generally, the core rod is rotated between 0.1 and 200 rpm. These conditions can produce etch rates typically in the range from below 0.01 grams/min. to greater than 10 grams/min.

Overall fiber cost is reduced through the use of larger overcladding tubes. Preferably, the tube comprises synthetic silica, which is known for its high purity, low attenuation, and high tensile strength. The purity of the overcladding tube will determine just how close to the core it can be placed. Step numeral 36 indicates that the core rod is overclad with a glass tube having a suitably low level of OH, which is to say that as the value of D/d becomes smaller, the purity of the tube needs to be higher (i.e., its OH content needs to be lower). For example, the following table illustrates various OH concentration levels in the overcladding tube that are suitably low for use in the present invention:

| D/d | OH Concentration |
|-----|------------------|
| 7.5 | <200 ppm |
| 5.2 | <1.0 ppm |
| 4.4 | <0.5 ppm |

Rod-in-Tube

Figure 5:
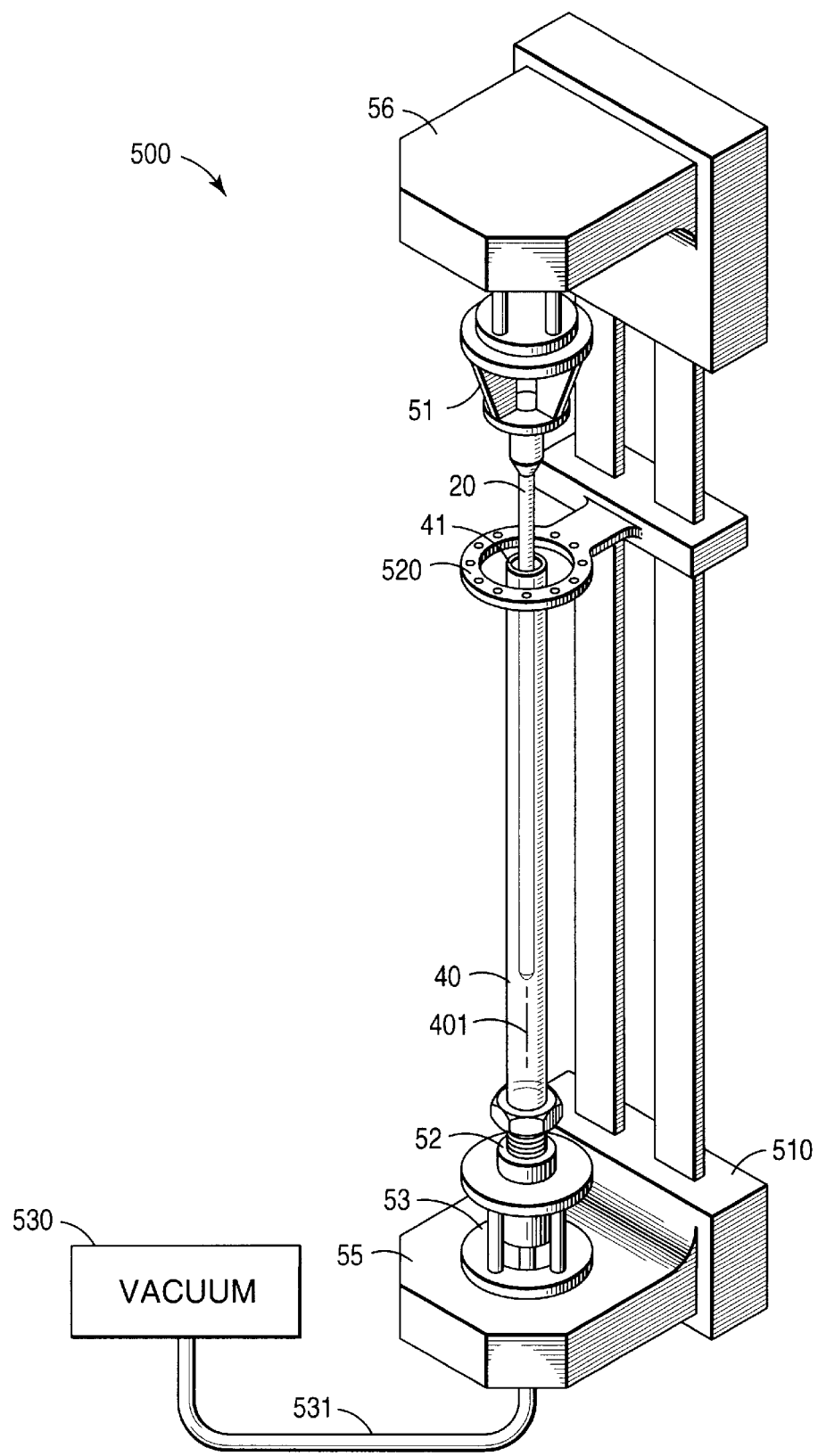
FIG. 5 is a perspective view of an apparatus for causing a core rod to be inserted into and aligned with a tube, and for causing the tube to be collapsed onto the rod.

Step numeral 37 in FIG. 3 indicates that the glass tube is now collapsed onto the core rod to create a preform. Reference is made to FIG. 5 for a discussion of this step. Apparatus 500 is used to install core rod 20 into a hollow glass tube 40, and to collapse the tube onto the rod. As shown in FIG. 5, the glass tube 40 is mounted with a longitudinal axis 401 thereof extending vertically. Also, the tube 40 is mounted in a gimbal-type chuck 52 which is mounted in a holder 53 supported on a lower arm 55 of a vertical lathe frame 510, so that it is hinged and can be moved pivotally in any direction about its base. The lower chuck 52 also provides a seal with the outer surface of the tube 40. The rod 20 is suspended from an overhead chuck 51 and aligned with the tube. The chuck 51 is supported from an upper arm 56, which is cantilevered from the lathe frame 510. Afterwards, relative is established between the lower and upper lathe arms 55 and 56, respectively, and hence between the tube and the rod to cause a substantial portion of the length of the rod to become disposed within the tube.

The clearance at any point between the outer surface of the rod 20 and the inner surface of the tube 40 is controlled. For example, a rod having an outer diameter of 20 mm would be used with a tube having an inner diameter of 21.5 mm so that a uniform clearance of about 0.75 mm obtains. And although it is preferred that the rod be centered within the tube at the outset, this objective is not always achieved upon insertion, and the rod sometimes touches the tube prior to collapse or is not concentric therewith. Should there be a pre-collapse touching or non-concentric condition (eccentricity), the resulting overclad preform will have a center which is offset from the center of the rod. Nevertheless, in order to reduce such eccentricity, the tube can be moved, as appropriate, via the gimbal-type joint at the base of lathe frame 510 that permits pivotal movement in any direction.

Figure 6:
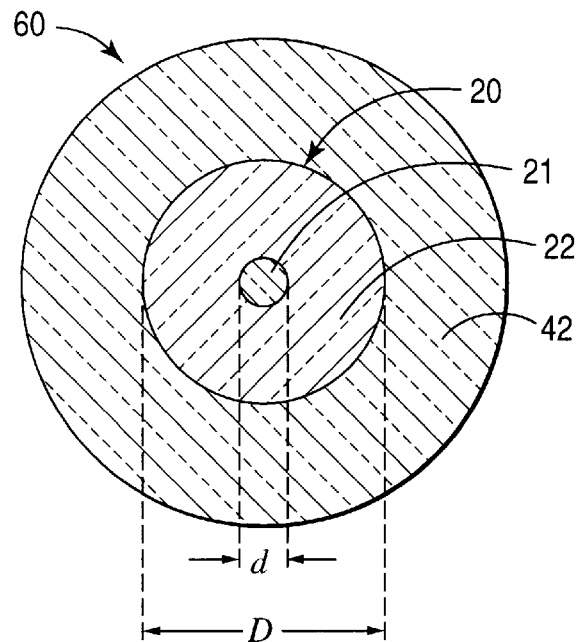
FIG. 6 shows the cross section of a glass preform according to the invention, illustrating the dimensions associated with its core and deposited cladding.

A ring-type torch 520, which may be an oxygen-hydrogen torch, for example, circumscribes the entire periphery of the tube 40. As the tube 40 and the rod 20 are turned about their longitudinal axes, the torch 520 heats the tube 40 sufficiently to allow the tube to reposition itself and form an offset at the location of the dwell of the torch, thereby allowing the tube to become centered about the rod. In effect, the tube 40 is stress-relieved by heating it at a specific location and allowing it to align itself with the rod 20. For a predetermined dwell time, the torch 520 remains at or near the top end 41 of the tube, thereby causing it to become sealed to the rod 20 at this point. At this time, vacuum apparatus 530 having a tube 531 that extends through the arm 55 and holder 53 and which is connected to a lower end of the tube, causes the pressure within the tube to be lowered with respect to the pressure outside the tube. As a result, the sealing of the top end portion of the tube to the rod is accomplished with a vacuum assist. Illustratively, the pressure inside the tube is about 0.2 atmosphere. After the dwell time, the torch 520 is moved downward, traversing the length of the tube. A vacuum is maintained as the torch traverses the length of the tube 40, subjecting successive increments of length of the tube to a zone of heat and causing the tube 40 to be collapsed at a relatively rapid rate onto the rod 20 to create a preform whose cross section is shown in FIG. 6. For more details regarding this process, reference is made to U.S. Pat. No. 4,820,322 that issued on Apr. 11, 1989 and is hereby incorporated by reference. Alternatively, the glass tube can be collapsed onto the core rod using a plasma torch to further reduce OH contamination as disclosed in U.S. Pat. No. 5,578,106 that issued on Nov. 26, 1996. It is generally not necessary to remove the OH layer on the outer surface of the overclad tube that is formed during the overcladding process because the OH layer is quite far from the core. Illustrative dimensions of the preform are: 100 cm (length); 63 mm (overcladding diameter); 19 mm (deposited cladding diameter); and 4.5 mm (core diameter). Accordingly, D/d= 4.2.

Fiber Draw and Coating

Step numeral 38 in FIG. 3 indicates the process of drawing an optical fiber from a heated (about 2000° C.) end portion of the preform. In the manufacture of optical fiber, the glass preform is suspended vertically and moved into a furnace at a controlled rate. The preform softens in the furnace and a glass fiber is drawn freely from the molten end of the preform by a capstan located at the base of a draw tower. Because the surface of the glass fiber is susceptible to damage caused by abrasion, it is necessary to coat the fiber after it is drawn—but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid by exposure to a source of radiation.

Figure 7:
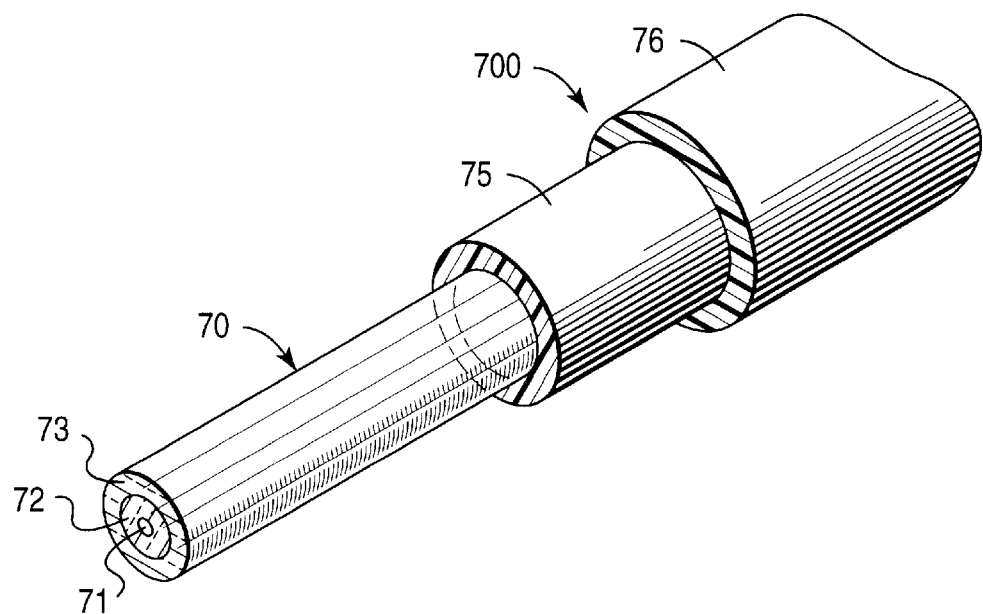
FIG. 7 shows an optical fiber, drawn from the glass preform of FIG. 6, after it has been coated with two protective coating layers.

FIG. 7 discloses a dual-coated optical fiber 700, in accordance with the present invention, after drawing. As shown, two layers of coating materials are applied to the drawn fiber 70, which comprises a light-carrying core 71, deposited cladding layer 72 and overcladding 73. Glass fiber 70 has a diameter of about 125 $\mu$m. It is noted that the relative dimensions of preform 60, shown in FIG. 6, correspond to the relative dimensions of the drawn fiber 70. (Even though the drawn fiber has a diameter that is thousands of times smaller than the preform, it has the same refractive index profile!) An inner layer 75 of protective coating material (primary coating) is applied to the glass fiber 70, and then an outer layer 76 (secondary coating) of protective coating material is applied on top of the primary coating. Both materials are acrylate-based polymers having predetermined hardness ratings. The secondary coating material generally has a relatively high modulus (e.g., $10^9$ Pa) to withstand handling, whereas the primary coating material has a relatively low modulus (e.g., $10^6$ Pa) to provide a cushion that reduces microbending losses. The secondary coating material may be applied while the primary coating is still wet, and then both coatings are simultaneously cured by radiation in the ultraviolet region of the electromagnetic spectrum.

Performance

Figure 8:
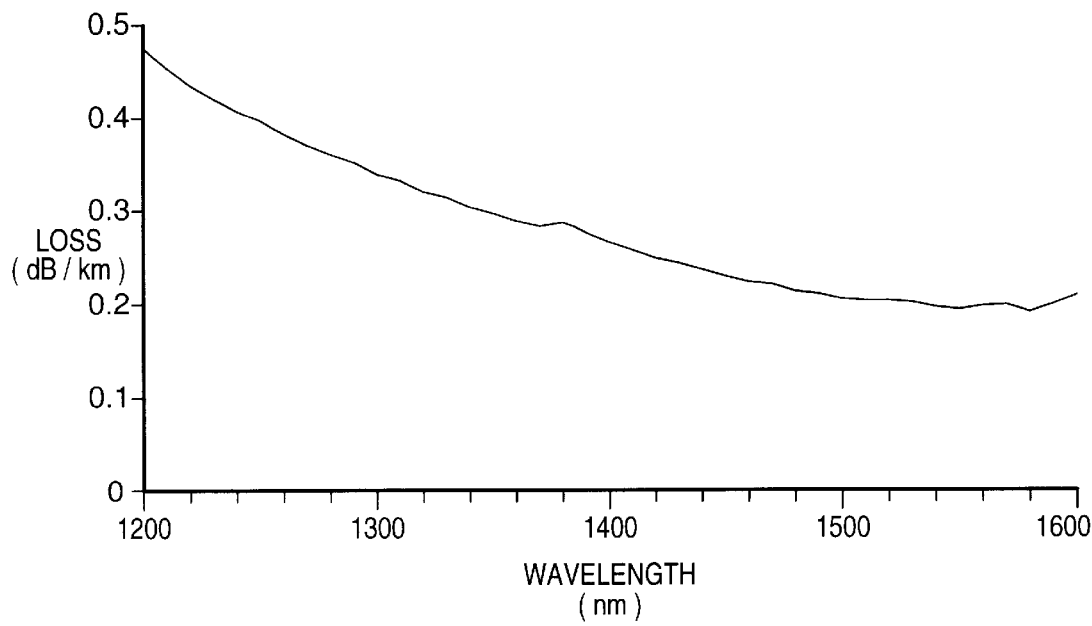
FIG. 8 is a graph showing the measured transmission characteristic of an optical fiber manufactured in accordance with the invention.

FIG. 8 shows the actual loss characteristic of an optical fiber manufactured according to the invention. The maximum measured loss in the 1385 nm region is less than 0.29 dB/km, which is well below the stated objective of keeping it lower than the measured loss at 1310 nm (about 0.33 dB/km).

WDM System

Figure 9:
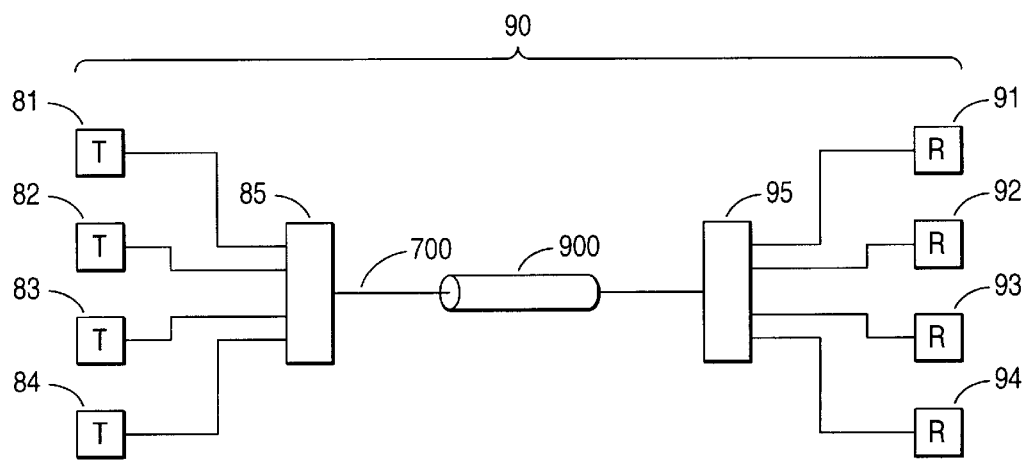
FIG. 9 discloses a four-channel WDM system operating over a transmission path that allows operation at wavelengths in the 1360–1430 nm region.

FIG. 9 discloses a wave-division-multiplex (WDM) system 90 in accordance with the invention. It comprises four transmitters 81–84 that modulate four predetermined wavelengths in the 1200–1600 nm region with four different baseband signals. At least one of the transmitters (e.g., 81) operates at a wavelength in the 1360–1430 nm region. Heretofore, operation within that "no man's land" has been effectively foreclosed to long-distance optical transmission (i.e., more than 10 kilometers) because of losses attributable to energy absorption by OH ions. The modulated wavelengths are then combined via multiplexer 85 and introduced into an optical cable 900, whose general construction is known by those skilled in the relevant art and disclosed in numerous publications. Illustratively, cable 900 includes one or more fibers including singlemode optical fiber 700 that is manufactured according to the processes described herein and, consequently, is suitable for transmitting optical signals in the wavelength region 1200–1600 nm, and which has a loss at 1385 nm which is less than its loss at 1310 nm. At the receiver end, the four-channels are split by demultiplexer 85, according to their wavelengths, and processed by receivers 91–94 to extract the individual baseband signals. Although not shown in FIG. 9, optical amplifiers may be included in the path between the multiplexer 85 and demultiplexer 95. Illustratively, the multiplexer and demultiplexer are passive optical networks.

Although various particular embodiments have been shown and described, it is understood that modifications are possible within the spirit and scope of the invention. These modifications include, but are not limited to, the fabrication of a core rod by a process other than VAD.

What is claimed is:

1. A method for making a singlemode optical fiber having low loss at 1385 nanometers (nm) including the following steps:

forming a glass rod by soot deposition, said rod comprising a cylindrical core having a diameter (d) surrounded by a layer of deposited cladding material having a diameter (D), wherein D/d<7.5;

dehydrating the glass rod in a chlorine- or fluorine-containing atmosphere at a temperature, which is less than 1300° C. in order to reduce the concentration of hydroxyl ions to a level that is less than about 0.8 parts per billion by weight;

consolidating the glass rod at a temperature, which is greater than 1400° C.;

providing a hollow cylindrical tube having an inside diameter that is slightly larger than the outside diameter of the glass rod, said tube being made from glass having a concentration of hydroxyl ions that is less than 200 parts per million by weight;

placing a substantial portion of the glass rod into the hollow tube; and exposing the tube to a heat source that moves longitudinally relative to said tube and rod, wherein the heat from the source causes the tube to collapse inwardly upon said rod forming a glass preform; and drawing a glass fiber from the glass preform, said fiber having a transmission loss that is less than 0.33 dB per kilometer at 1385 nm.

2. The method of claim 1 further including the following steps:

applying a protective coating material to the drawn glass fiber; and exposing the protective coating to a source of radiation in order to cure the protective coating material, whereby an optical fiber is created.

3. The method of claim 1 further including the following steps:

elongating the glass rod using a heat source that contaminates the surface of the rod with hydroxyl ions; and eliminating hydroxyl ions from the surface of the elongated glass rod by removing an outer portion of said surface to reduce its diameter by a predetermined amount.

4. The method of claim 3 wherein the step of elongating the glass rod is performed with an oxygen-hydrogen torch.

5. The method of claim 3 wherein the step of eliminating hydroxyl ions from the surface of the elongated glass rod is performed with a hydrogen-free plasma torch.

6. The method of claim 1 wherein 2.0<D/d<7.5.

7. The method of claim 1 wherein the soot deposition process comprises vapor axial deposition.

8. The method of claim 1 wherein the core is doped with germanium.

9. The method of claim 1 wherein the deposited cladding is doped with Fluorine.

* * * * *